UNITED STATES PATENT OFFICE.

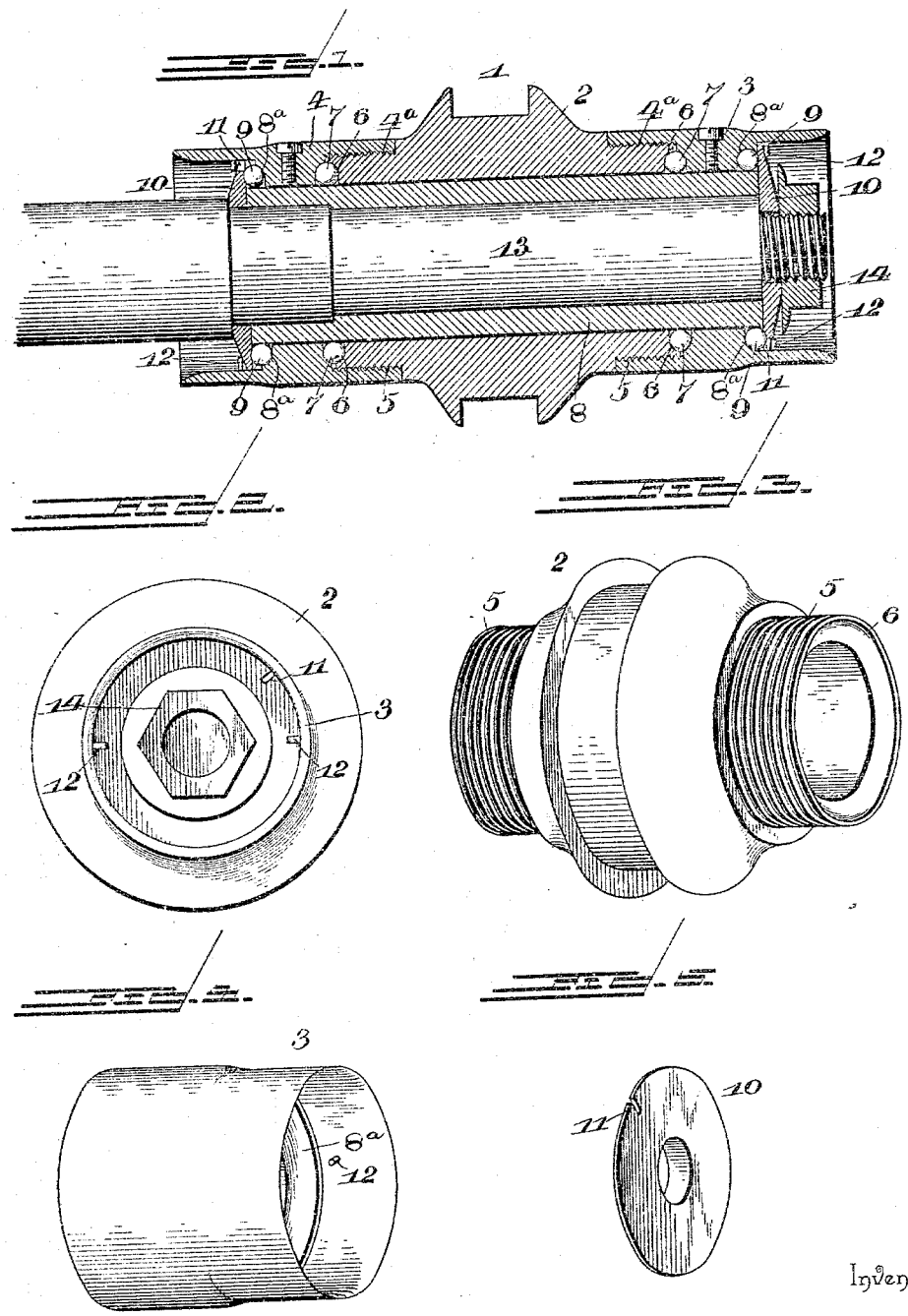

HIRAM L. STUART, OF ROSSTON, PENNSYLVANIA.

VEHICLE-HUB.

SPECIFICATION forming part of Letters Patent No. 551,414, dated December 17, 1895.

Application filed August 23, 1895. Serial No. 560,268. (No model.)

*To all whom it may concern:*

Be it known that I, HIRAM L. STUART, a citizen of the United States, residing at Rosston, in the county of Armstrong and State of Pennsylvania, have invented a new and useful Vehicle-Hub, of which the following is a specification.

The invention relates to improvements in vehicle-hubs.

The object of the present invention is to improve the construction of vehicle-hubs and to increase the durability of spindles and hubs by relieving the spindles and the axle-boxes of wear.

The invention consists in the construction and novel combination and arrangement of parts, hereinafter fully described, illustrated in the accompanying drawings, and pointed out in the claim hereto appended.

In the drawings, Figure 1 is a longitudinal sectional view of a hub constructed in accordance with this invention. Fig. 2 is a front elevation of the same. Fig. 3 is a detail perspective view of the central section of the hub. Fig. 4 is a similar view of one of the end sections. Fig. 5 is a detail perspective view of one of the end washers.

Like numerals of reference indicate corresponding parts in all the figures of the drawings.

1 designates a hub composed of a central section 2 and end sections 3 and 4 located respectively at the outer and inner ends of the central section 2, and provided at their inner terminals with interiorly-threaded portions $4^a$, adapted to screw on exteriorly-threaded end portions 5 of the central section, the threads being right and left hand ones. The central section is provided on its interior at its ends with annular grooves or recesses 6, receiving balls 7 which bear against an axle-box 8. The end sections retain the series of balls 7 in the annular grooves or recesses 6, and they are provided at their outer ends with annular recesses $8^a$, receiving balls 9 which bear against the terminals of the axle-box 8, and which are retained in position by washers 10, which also lock the axle-box 8 in the hub. Each washer 10 is provided with a recess 11, and is retained in its end section by a pair of lugs 12. One side of the washer is adapted to be engaged under one of the lugs 12, and the recess 11 is of a size to permit the other lug to pass through it, whereby the washer is introduced behind the lugs and is adapted to be rotated to carry its recess 11 away from the lug. The washer is removed by bringing the recess opposite one of the lugs 12 and drawing it outward.

The hub is retained on a spindle 13 by an axle-nut 14, and the central section 2 is adapted to receive the spokes of a wheel, and any suitable construction of spoke-socket may be provided. The hub is also provided at points intermediate the rows of balls 7 and 9 with lubricating-holes into which are inserted threaded plugs or screws 12.

It will be seen that the hub is simple and comparatively inexpensive in construction, that the axle-box is adapted to rotate freely within the same, and that both the spindle and the axle-box are relieved of wear and have their durability correspondingly increased.

Changes in the form, proportion, and the minor details of construction may be resorted to without departing from the principle or sacrificing any of the advantages of this invention.

What I claim is—

A hub comprising a central section having spoke sockets and provided at its terminals with bearing recesses, inner balls arranged within said recesses, the outer sections of the hub secured to the inner sections and provided at their outer terminals with bearing recesses, outer balls arranged within the end sections, a continuous axle box 13 arranged within the hub and extending from one end to the other of the same and receiving said balls on its outer face, and removable end washers interlocked within the outer ends of the end sections and retaining the outer balls in their recesses and also confining the axle box in the hub, substantially as described.

In testimony that I claim the foregoing as my own I have hereto affixed my signature in the presence of two witnesses.

HIRAM L. STUART.

Witnesses:
 D. P. STUART,
 ED H. ALLEN.